Oct. 9, 1928.

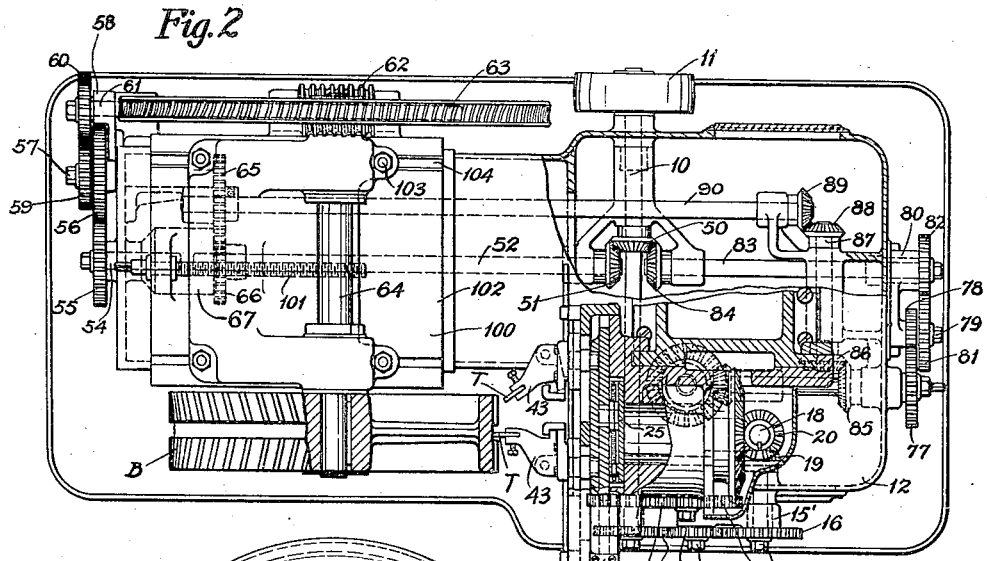

A. H. CANDEE ET AL 1,686,550

METHOD OF AND MACHINE FOR CUTTING CYLINDRICAL GEARS

Filed Nov. 2, 1926   2 Sheets-Sheet 2

INVENTORS
Allan H. Candee
Magnus H. Johanson
BY
ATTORNEY

Patented Oct. 9, 1928.

1,686,550

UNITED STATES PATENT OFFICE.

ALLAN H. CANDEE AND MAGNUS H. JOHANSON, OF ROCHESTER, NEW YORK, ASSIGNORS TO GLEASON WORKS, OF ROCHESTER, NEW YORK, A CORPORATION OF NEW YORK.

METHOD OF AND MACHINE FOR CUTTING CYLINDRICAL GEARS.

Application filed November 2, 1926. Serial No. 145,903.

The present invention relates to gears and primarily to a method and machine for producing spur, helical, and double helical or herringbone gears.

The primary object of this invention is to provide an improved method for cutting spur, helical and double helical or herringbone gears in a continuous planing process and to furnish a machine capable of carrying out the new method.

When a tool is reciprocated in a straight path across the face of a cylindrical gear blank which is rotated continuously and at a uniform velocity on its axis, a helical slot will be cut in the blank. The rotation of the blank while the tool is out of cutting position and during the time it is being returned to its initial position preparatory to another cut, will cause the blank to be automatically and continuously indexed. This method of producing helical gears has certain marked advantages, particularly for large size gears, among which are chiefly the economy in tool cost over processes in which a worm hob is employed, and the increased accuracy of tooth spacing, the reduction in cutting time and the structural simplification over methods and machines employing intermittent indexing.

The advantages of the continuous planing process in the production of gears of the type described have been long realized, but the tooth curve resulting from the methods heretofore proposed for practicing this process has had such practical limitations and drawbacks, that the process itself has never come into general use. In the methods heretofore proposed for cutting these gears, the motions which is was contemplated employing, were the reciprocatory motion of the tool, the continuous rotary motion of the blank and in addition a relative rolling movement between tool and blank for the generation of the tooth profiles. The tool reciprocations were to be obtained from a crank or equivalent mechanical means.

Now the motion imparted to a planing tool by a crank is at a variable velocity which combined with the continuous rotary motion of the blank will produce a tooth on the blank which is longitudinally of sinusoidal curvature, that is, a tooth of general S-shape.

Gears having teeth of S-shape lack adjustment, the S-shaped character of the tooth curves will not permit of any relative axial movement between mating gears and the gears consequently cannot accommodate themselves to varying conditions of ordinary useage. In many cases, moreover, because of the character of curve produced, the tool clearance angle will change considerably as the tool moves across the face of the blank in cutting the gear and this may cause interference between the tool and the side of tooth opposite that being cut or may cause chattering or a poor finish on the surface being cut.

All these difficulties are avoided in the present invention. The tooth curves can be matched exactly or as closely as desired; the gears are capable of adjustment; and the tool clearance angle in cutting them will remain substantially constant throughout the cut. In addition, with the present method, the tool bearing can be concentrated anywhere along the face of the teeth.

The motion imparted to a planing tool by a crank is a variable velocity motion of a simple harmonic nature, the tool moving fastest at the middle of the stroke and slower toward each end. We have discovered that by imparting another relative variable velocity motion between the tool and blank in addition to the relative motions heretofore employed, also of a harmonic nature, but preferably of a different frequency from the harmonic motion of the tool, gears can be cut in a continuous planing process which will have all the advantages described and which in addition may have teeth which are substantially straight in development, resembling in this respect helical gears now in general use.

The present invention contemplates, therefore, reciprocating the tool across the face of the blank while rotating the blank continuously on its axis and in addition simultaneously imparting a further relative motion at a variable velocity, preferably of a harmonic nature, between the tool and the blank. If it is desired to generate the tooth profiles any usual or suitable rolling motion, may, of course, also be employed.

The added variable velocity harmonic motion, new with this invention, may be imparted to the tool or blank in any one of three ways: (1) by an added rotation of the blank at a variable velocity to combine with the continuous uniform rotary movement heretofore employed; (2) by an added variable velocity movement to be imparted directly to the tool and to be combined with the reciprocating movement caused by the crank; and (3) by an added relative movement between the tool and blank at a variable velocity on the basic rack or other basic member with which the blank is theoretically rolled to generate the tooth profiles—this last motion may be combined with the generating motion itself.

The present application is a continuation in part of our copending application, Serial No. 70,864, filed November 23, 1925.

The accompanying drawings illustrate diagrammatically the features underlying this invention and show one embodiment of a machine for practicing the invention, said embodiment, constituting, however, but one of the various mechanical forms in which the principles of the invention may be embodied.

In the drawings:

Figure 1 is a side elevation, with parts broken away, of a machine constructed according to one embodiment of this invention;

Figure 2 is a plan view, partly in section, of the machine shown in Figure 1.

Figure 7:
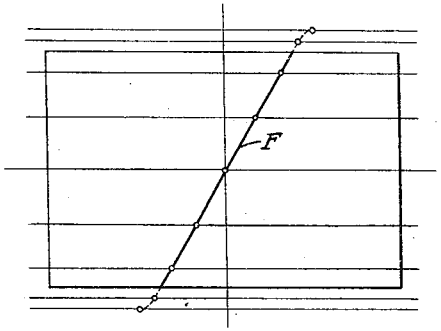
Figure 6:
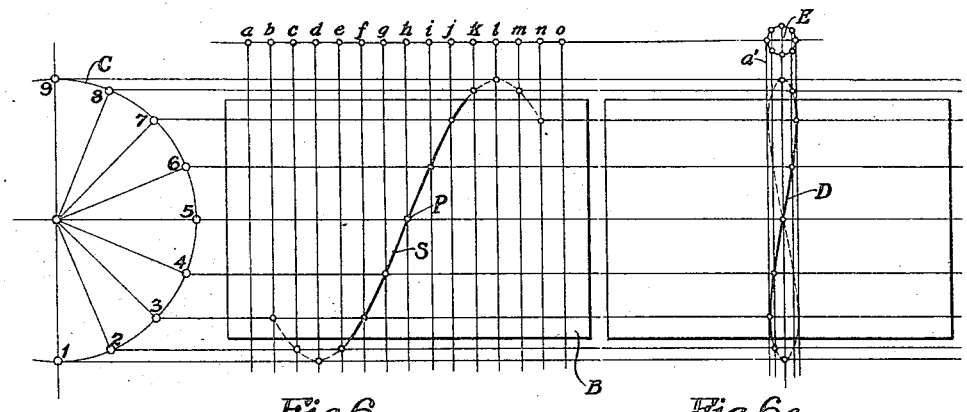
Figure 6A:
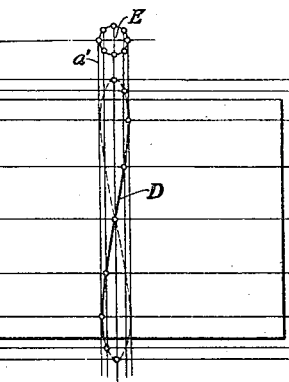

Figures 6 and 6ª are diagrammatic views, illustrating the forms of curve produced through the various harmonic motions employed in the machine and process of this invention; and Figure 7 is a diagrammatic view, illustrating the curve resulting when these motions are combined.

In producing gears according to this invention, the tool is reciprocated by means of a crank or equivalent mechanical element, the blank is rotated continuously on its axis at a uniform velocity, and simultaneously an additional relative movement at a variable velocity is imparted between tool and blank by means of a crank, eccentric, or other device for producing a variable velocity motion. The principles underlying the present invention are illustrated diagrammatically in Figures 6, 6ª and 7, where the curves produced by the various motions employed are shown in development.

Figure 6 shows the curve produced where a tool is moved by a crank across the face of a continuously rotating gear blank. In this figure, C represents the circle on which the crank pin moves. As the tool moves across the face of the blank under actuation of the crank, the blank, shown in development at B rotates on its axis at a uniform velocity. The vertical lines $a$, $b$, $c$, etc. indicate the various positions of the blank due to its uniform rotation, while the horizontal lines 1, 2, 3, 4, etc. indicate the various positions taken by the tool in the same period under actuation of the crank. The curve produced by these two motions is shown at S. It is a curve of double inflection, being curved in opposite directions each side of the point P. The dotted line extensions at each end of the curve indicate the path taken by the tool after it has been lifted or clapped out of cutting position and is being returned to its initial position for cutting a new tooth space. The continuous rotation of the blank during this idle movement of the tool serves, as already described, to index the blank. No complicated index mechanism is necessary; if there is any tool wear it is distributed equally over all the teeth and extreme accuracy in tooth spacing is achieved.

Figure 6ª shows the curve which might be produced upon a blank when the tool is reciprocated at a variable velocity by means of the crank across the face of the blank and when an additional relative movement at a variable velocity is imparted, as by means of an eccentric or crank, between tool and blank. The motion of the eccentric or second crank will preferably be at twice the frequency of the harmonic motion of the tool under actuation of the crank, as it has been found that such a combination gives the most desirable results as regard tool clearance and longitudinal tooth curvature. The eccentric or second crank is indicated diagrammatically at E. The horizontal lines as before indicate the various positions taken by the tool under actuation of the crank, while the vertical lines $a'$, indicate the relative movement that takes place between the tool and blank due to the rotation of the eccentric. The curve which would result from these two motions is shown at D.

When the motions which produce the curves F and B are combined that is, when a tool is moved at a variable velocity across the face of a blank rotating on its axis at a uniform velocity while simultaneously an additional relative movement at a variable velocity is imparted between tool and blank the curve F will result, shown in Figure 7. By properly adjusting the throw of the eccentric or second crank a curve F may be obtained which, as shown, will be substantially straight in its main portion in development. By changing the angular adjustment of the second crank or eccentric in cutting the two members of a pair the tooth curves can be mis-matched as much as desirable so that the tooth bearing can be concentrated at the center or anywhere along the faces of the teeth. In cutting the tooth curve F moreover, the tool clearance angle will be substantially uniform along the whole length of the cut with the consequence that interference and chatter will be avoided and smooth tooth surfaces will result.

Gears produced according to this invention may be cut with or without a generating motion, as desired. This motion, however, has no effect on the longitudinal tooth curve produced.

In the machine illustrated in the accompanying drawings and forming one embodiment of a mechanism for carrying into effect this invention, the additional variable velocity movement is produced in the third way described above, namely, by a relative movement of tool and blank at a variable velocity along the basic member with which during the generating operation the blank is theoretically rolled. In this machine, therefore, the tool is reciprocated at a variable velocity across the face of the blank in a plane parallel to the blank axis; the blank is rotated on its axis at a uniform velocity; a relative rolling motion is imparted between tool and blank to generate the tooth profiles; and simultaneously a further relative movement is imparted between tool and blank at a variable velocity in the manner of a gear moving at a variable velocity on the basic member with which during the generating operation the blank is theoretically rolling.

The machine illustrated is for cutting herringbone gears and two planing tools are employed, cutting from opposite sides of the blank toward the center. This machine might, however, be used for cutting single helical gears and in this case only one tool would be required. As in other planing machines, the tools cut during their movement in one direction only, being out of cutting position on the return stroke.

Referring now to the figures of the drawings illustrating the machine, 10 indicates the main drive shaft which may be driven from any suitable source of power as by means of the pulley 11. The shaft 10 is journalled in suitable bearings in the frame or base 12 of the machine and carries near the end removed from the pulley 11, a spur gear 13. The gear 13 meshes with a spur gear 14 on a stub shaft 15 journalled in a quadrant 15' and the spur gear 14 meshes in turn with another spur gear 16 secured to the shaft 17 which is also journalled in the frame. The gears 13, 14 and 16 serve, therefore, to transmit the rotation of the main drive shaft 10 to the shaft 17. These gears form a set of speed change gears governing the speed of rotation of the crank which actuates the tool.

The shaft 17 drives a vertical shaft 18 through a pair of miter gears 19. The shaft 18 has a splined connection with a bevel pinion 20 which is mounted in a suitable bearing in a slide or carrier 21. The pinion 20 meshes with a bevel gear 22 which is secured to the crank shaft 23 rotatably mounted in a suitable bearing provided upon the slide 21.

The crank shaft 23 carries at its forward end the crank plate or disc 25. The crank plate 25 is connected by means of the pin 26, and the block 27 with the tool slide 28, the slide 28 being provided with a slot 29 in its rear face in which the block 27 slides. The rotation of the crank disc reciprocates the slide 28 in the horizontal guide-ways 30 formed on the face of the slide or carrier 21.

Figure 3:
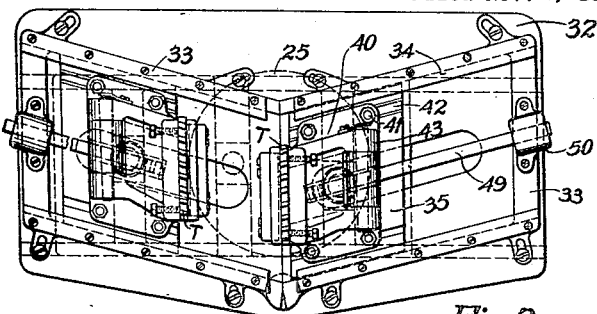
Figure 3 is a front elevation of the tool mechanism of this machine.
Figure 4:
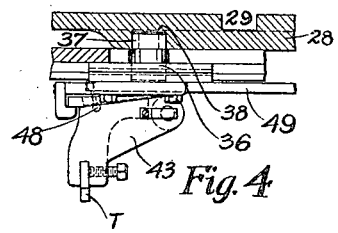
Figures 4 and 5 are details of the tool mechanism.
Figure 5:
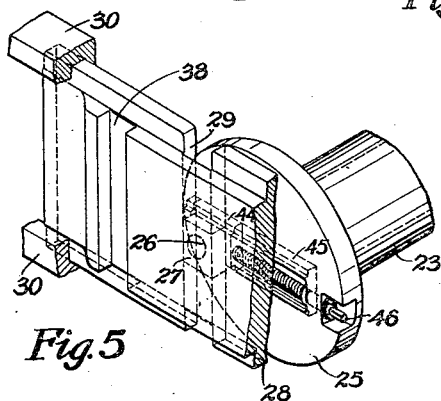

Secured to the slide or the carrier 21 is a face plate 32 which surrounds and houses the slide 28. Mounted on this face plate 32 for angular adjustment thereon are a pair of guide members 33 which are formed with guide-ways 34 for guiding the tool head carriers or slides 35 in their reciprocating movement. These tool head carriers or slides 35 carry blocks 36 (Figure 4) which are swivelly connected with blocks 37 which engage in slots 38 formed in the front face of the slide 28. There are two slots 38 and two sets of blocks 36 and 37, one for each of the tool head carriers or slides 35. Each tool head carrier 35 carries a tool head 40, the tool head 40 being adjustable on the carriers 35. The tool heads may be secured in any adjusted position on their respective carriers 35 by means of the bolts 41 which engage in T-slots 42 formed in the carriers 35. The tools T are carried on clapper blocks 43 which are pivotally mounted on the heads 40.

By the means described, a reciprocatory motion is imparted to each of the tools T at a variable velocity of a harmonic nature. The block and pin connection between the crank disc 25 and the slide 28 imparts a reciprocatory motion to the slide 28 as the crank disc rotates. This reciprocatory motion is imparted by means of the blocks 36 and 37 and the slots 38 in the slide 28 to the tools.

The tools shown are of the rack type, being provided with a plurality of cutting blades. If desired, however, a single double edged cutting tool, a single edged cutting tool or two single edged cutting tools may be employed. The tools may be of straight or curved profile.

The angular adjustment of the guide members 33 upon the base plate 32 permits of setting the tools so as to cut gears of different helix angles, while the adjustment of the tool heads 40 upon the tool head carriers or slides 35 permits of setting the tools any desired distance apart to vary the portion of the face of the blank to be cut. The pin 26 is carried on a block 44 which is adjustable in a slot 45 formed in the face of the crank disc 25, by means of the screw 46. This is the usual adjustment and enables the throw of the crank to be changed to vary the stroke of the tools.

The tools cut on their movement in one direction only and are clapped out of cutting position on the return stroke. Any suitable mechanism may be employed for clapping the tools out of cutting position and this forms no part of the present invention. As shown, each of the clapper blocks 43 is connected by means of a toggle member 48 with a rod 49 which slides in a friction block 50 which is secured to a guide member 33.

During the reciprocatory movement of the tools and in timed relation therewith, the blank is rotated on its axis continuously and at a uniform velocity. The mechanism for imparting to the blank its continuous rotary movement will now be described. Secured to the main drive shaft 10 intermediate its ends is a bevel gear 50 which meshes with a bevel gear 51 secured to a cross shaft 52 which is journaled in the base or frame of the machine. The cross shaft 52 carries adjacent its outer end one of a set of differential gears 53 which operatively connect the shaft 52 with a shaft 54 which is journalled in the frame. The shaft 54 carries at its outer end a spur gear 55.

The spur gear 55 meshes with a spur gear 56 secured to a shaft 57 which is mounted upon a quadrant 58. The shaft 57 carries a second spur gear 59 which meshes with a spur gear 60 which is secured upon the shaft 61 which is suitably journalled in the base 12. This shaft 61 has a splined connection with a worm 62 which meshes with a worm wheel 63 which is secured to the blank spindle 64. By the gearing described, a uniform rotary motion is imparted to the blank spindle 64 and to the blank B mounted thereon.

The machine illustrated is designed for generating the tooth profiles and in this machine the additional variable velocity movement, new with this invention, is produced by imparting a variable velocity movement between tool and blank on the basic gear with which the blank is theoretically rolled to generate the tooth profiles. In the machine, illustrated, the generating motion comprises a relative rolling movement between tool and blank in the manner of a gear meshing with a rack and is obtained by imparting a slow movement of translation to the carrier or slide 21 continuously in one direction during the cutting of the blank. The means for imparting to the slide or carrier 21 the movement necessary to generate the tooth profiles will first be described.

The slide or carrier 21 moves on guide ways 70 formed on a standard 71 to carry the tools T in a direction tangential to the pitch surface of the blank, thus imparting a relative movement between the tool and blank as of a gear rolling on a rack. The standard 71 is secured in any suitable manner to the base 12. The translatory movement of the slide 21 is produced by means of the screw 72 which rotates in a nut 73 secured to the slide 21. Rotary movement is imparted to the screw 72 by means of a bevel gear 74 which has a splined connection with the shaft of the screw 72 and which meshes with a bevel pinion 75 which is secured to a shaft 76 which is journalled in the base 12. The shaft 76 carries adjacent its outer end a spur gear 77 which meshes with a spur gear 78 secured to a stub shaft 79 which is mounted upon a quadrant 80. The stub shaft 79 carries a second spur gear 81 which meshes with a spur gear 82 which is secured to a cross shaft 83 which is journalled in the base 12 and which is driven from the main drive shaft 10 by means of a bevel gear 84 which meshes with the bevel gear 50. The gears 77, 78, 81 and 82, constitute a set of pitch or ratio change gears governing the relative rolling movement of tool and blank.

A predetermined timed relation must be maintained between the tool reciprocation and blank rotation in order that the teeth be properly spaced on the blank. The translatory movement imparted to the tools by means of the carrier or slide 21 would disturb this predetermined timed relation unless some means were provided to compensate therefor. Change gears might be employed for this purpose, but these would require considerable calculation and a change of combination with each change in the rate of roll or pitch of the teeth. Preferably, therefore, a differential is employed. The differential has the advantage of permitting any desired pitch of teeth to be cut while always maintaining the proper timed relation between the tool and blank. The differential, moreover, will always impart the exact compensating motion required and no approximation is necessary as would be the case, in many instances, where the calculated change gears would have a fractional number of teeth and could only be approximated by gears having the nearest integral number of teeth. The differential gears 53 serve, as the compensating means, acting to increase or decrease the rotation of the blank to compensate for the translatory movement of the tools.

The compensating motion is taken from the shaft 76 by means of the miter gears 85 and 86, one of which is secured to the shaft 76 and the other of which is secured to a transverse shaft 87 which is journalled in suitable bearings in the base 12. The shaft 87 carries at its outer end a miter gear 88 which meshes with a miter 89 secured to the cross shaft 90. The cross shaft 90 carries adjacent its outer end a spur gear 65 which meshes with a spur gear 66 which is secured to the housing 67 of the differential gears 53.

So far, we have described the mechanism for reciprocating the tool, the mechanism for imparting a continuous rotary movement to the blank, the mechanism for imparting a relative rolling movement between the tool and blank by translation of the tool and the means for compensating for this translatory movement to maintain the timed relation between the tool reciprocation and blank rotation. To these motions there is added, in the present invention, a further relative movement between tool and blank at a variable velocity, which is produced in the machine shown by a reciprocatory movement of the slide or carrier 21 at a variable velocity. This reciprocatory movement is produced by means of a crank 92 which is mounted on a shaft 93 journalled in the base 12 and which is connected by means of the crank pin 94 and slot 95 with a head 96 which is swivelly secured to the lower end of the elongated shaft which carries the screw 72. The amount of throw of the crank 92 can be adjusted by any usual or suitable means for different pitches of teeth. The crank 92 acts to impart to the elongated screw shaft 72 a reciprocatory movement, at a variable velocity which in turn is imparted to the slide or carrier 21. The shaft 72 is, as previously described, splined for a portion of its length so that it can reciprocate under impulse of the crank 92 while being rotated through rotation of the bevel gear 74. The combined reciprocatory and rotary motion of the shaft 72 acts to impart to the carrier or slide 21 a movement which is a resultant of the rolling motion necessary to generate the tooth profiles and of the additional variable velocity movement which co-acts with the reciprocatory movement of the tool and the continuous rotary motion of the blank to form the longitudinal tooth curve.

The crank 92 is driven preferably, at twice the speed of the crank 25, being rotated from the main drive shaft by the spur gears 97 and 98.

During the generation of a gear, therefore, a reciprocatory movement will be imparted to the tool or tools in timed relation with the rotary movements imparted to the blank and simultaneously a movement will be imparted to the carrier or slide 21 which is a resultant of the combined rotary and reciprocatory movements of the screw shaft 72. The tools may cut on successive strokes in successive tooth spaces or, if desired, may skip a number of tooth spaces between strokes. With the present machine, however, the skipping of a number of tooth spaces is not necessary, since any desired helix angle can be obtained by the angular adjustment of the guide members 33. The combined motion imparted to the slide or carrier 21 will act to gradually move the slide 21 up or down on the standard 71. After a blank has been completely generated, the slide 21 may be returned to its initial position for cutting a new blank. For this purpose, the shaft 76 may be rotated in a reverse direction by hand, or, if desired, any suitable type of reversing mechanism may be employed.

The present machine may be employed for roughing or finishing. During the roughing operation, the ratio change gears may be disconnected so that the only movement imparted to the slide 21 is the reciprocatory movement due to the crank 92. For roughing, a feed movement is required to move the blank relative to the tools so that they can cut to the proper depth. For this purpose, in the present machine the blank spindle 64 is journalled in suitable bearings on a slidable head 100. The head 100 may be fed toward the tools by means of the screw 101 which may be driven automatically, or, as shown, may be rotated by hand. For the finishing cut, no feed movement is required and the blank head 100 may be secured to the blank head carrier 102, which is mounted on the base 12, by means of the bolts 103 which take into T-slots 104 provided in the carrier 102.

While particularly applicable to the production of spur, helical and double helical or herringbone gears, the present invention may be employed, also, in the cutting of internal gears.

In general, it may be said, that while we have described our invention with reference to a particular embodiment, it is to be understood that the invention is capable of various further modifications and uses and that this application is intended to cover any adaptations, uses, or embodiments of the invention, following in general, the principles of the invention including such departures from the present disclosure as come within known or customary practise in the gear art and may be applied to the essential features hereinbefore set forth and as fall within the scope of the invention or the limits of the appended claims.

Having thus described our invention what we claim is:

1. The method of producing gears, which consists in moving a tool at a variable velocity across the face of a cylindrical blank in a plane parallel to the axis of the blank, while rotating the blank continuously on its axis at a uniform velocity and simultaneously imparting an additional relative movement between the tool and blank at a variable velocity, which combined with the other motions will produce the longitudinal tooth form.

2. The method of producing gears which consists in moving a tool at a variable velocity of a harmonic nature across the face of a cylindrical blank in a plane parallel to the blank axis, while rotating the blank continuously on its axis at a uniform velocity, and simultaneously imparting an additional relative movement between the tool and blank at a variable velocity also of a harmonic nature, said last named movement acting in conjunction with the other movements to produce the longitudinal tooth form.

3. The method of producing gears which consists in moving a tool at a variable velocity of a harmonic nature across the face of a cylindrical blank in a plane parallel to the blank axis, while rotating the blank continuously on its axis at a uniform velocity, and simultaneously imparting an additional relative movement between the tool and blank at a variable velocity also of a harmonic nature but of a different frequency from the first harmonic motion, said last named movement acting in conjunction with the other movements to produce the longitudinal tooth form.

4. The method of producing a gear which consists in moving a tool at a variable velocity of a harmonic nature across the face of a cylindrical blank in a plane parallel to the blank axis, while rotating the blank continuously on its axis at a uniform velocity, and simultaneously imparting an additional relative movement between the tool and blank at a variable velocity also of a harmonic nature, but of twice the frequency of the first harmonic motion, said last named movement acting in conjunction with the other movements to produce the longitudinal tooth form.

5. The method of producing a gear which consists in moving a tool, at a variable velocity, across the face of a cylindrical gear blank in a plane parallel to the blank axis, while rotating the blank on its axis continuously at a uniform velocity, simultaneously imparting an additional relative movement between the tool and blank at a variable velocity to produce the longitudinal tooth shape and continuously index the blank, and simultaneously producing a relative rolling motion between the tool and blank at a uniform velocity to generate the tooth profiles.

6. The method of producing a gear which conists in moving a tool, at a variable velocity, across the face of a cylindrical gear blank in a plane parallel to the blank axis, while rotating the blank on its axis continuously at a uniform velocity, simultaneously imparting an additional relative movement between the tool and blank at a variable velocity to produce the longitudinal tooth shape and continuously index the blank, and simultaneously producing a relative rolling motion between the tool and blank at a uniform velocity in the manner of a gear rolling on a rack to generate the tooth profiles.

7. The method of producing a gear which consists in moving a tool, at a variable velocity of a harmonic nature, across the face of a cylindrical gear blank in a plane parallel to the blank axis, while rotating the blank on its axis continuously at a uniform velocity, simultaneously imparting an additional relative movement between the tool and blank at a variable velocity also of a harmonic nature but of a different frequency from the first harmonic motion to produce the longitudinal tooth shape and continuously index the blank, and simultaneously producing a relative rolling motion between the tool and blank at a uniform velocity to generate the tooth profiles.

8. The method of producing a gear which consists in moving a tool, at a variable velocity of a harmonic nature, across the face of a cylindrical gear blank in a plane parallel to the blank axis, while rotating the blank on its axis continuously at a uniform velocity, simultaneously imparting an additional relative movement between the tool and blank at a variable velocity, also of a harmonic nature but of a different frequency from the first harmonic motion to produce the longitudinal tooth shape and continuously index the blank, and simultaneously producing a relative rolling motion between the tool and blank at a uniform velocity in the manner of a gear rolling on a rack to generate the tooth profiles.

9. The method of producing a gear which consists in moving a tool, at a variable velocity, across the face of a cylindrical gear blank in a plane parallel to the blank axis, while rotating the blank continuously on its axis at a uniform velocity, and simultaneously imparting between the tool and blank a continuous translatory movement at a variable velocity in a direction tangential to the pitch surface of the blank.

10. The method of producing a gear which consists in moving a tool, at a variable velocity of a harmonic nature, across the face of cylindrical gear blank in a plane parallel to the blank axis while rotating the blank continuously on its axis at a uniform velocity, and simultaneously imparting between tool and blank a continuous translatory movement in a plane tangent to the pitch surface of the blank at a variable velocity also of a harmonic nature but of a different frequency from the first harmonic motion.

11. In a machine for producing cylindrical gears, a tool support, tool mechanism mounted thereon, a blank support, a blank spindle journalled therein, means for moving the tool at a variable velocity across the face of the blank in a plane parallel to the blank axis, means for imparting a continuous rotary movement at a uniform velocity to the blank spindle, and means for simultaneously imparting an additional relative movement at a variable velocity between the tool and blank to produce in combination with the other movements the longitudinal tooth form.

12. In a machine for producing cylindrical gears, a tool support, a tool mounted thereon, a blank support, a blank spindle journalled therein, means for moving the tool at a variable velocity of a harmonic nature across the face of the blank in a plane parallel to the blank axis, means for imparting a continuous rotary movement at a uniform velocity to the blank spindle, and means for simultaneously imparting an additional relative movement between tool and blank at a variable velocity also of a harmonic nature but of a different frequency from the first harmonic motion to produce in combination with the other movements the longitudinal tooth form.

13. In a machine for producing cylindrical gears, a tool support, a tool mounted thereon, a blank support, a blank spindle journaled therein, means for moving the tool at a variable velocity across the face of the blank in a plane parallel to the blank axis, means for imparting a continuous rotary movement at a uniform velocity to the blank spindle, means for simultaneously imparting an additional relative movement between the tool and blank at a variable velocity, said last named motion combining with the before mentioned movements to produce the longitudinal tooth shape and means for simultaneously producing a continuous relative rolling motion between the tool and blank to generate the tooth profiles.

14. In a machine for producing cylindrical gears, a tool support, a tool mounted thereon, a blank support, a blank spindle journaled therein, means for moving the tool, at a variable velocity of a harmonic nature, across the face of the blank in a plane parallel to the blank axis, means for imparting a continuous rotary movement at a uniform velocity to the blank spindle, means for simultaneously imparting an additional relative movement between the tool and blank at a variable velocity also of a harmonic nature but of a different frequency from the first harmonic motion, said last named motion combining with the before mentioned movements to produce the longitudinal tooth shape, and means for simultaneously producing a continuous relative rolling motion between the tool and blank at a uniform velocity to generate the tooth profiles.

15. In a machine for producing cylindrical gears, a tool support, a tool mounted thereon, a blank support, a blank spindle journaled therein, means for moving the tool at a variable velocity across the face of the blank in a plane parallel to the blank axis, means for imparting a continuous rotary movement at a uniform velocity to the blank spindle, means for simultaneously imparting an additional relative movement between the tool and blank at a variable velocity, said last named motion combining with the before mentioned movements to produce the longitudinal tooth shape and means for simultaneously producing a continuous relative rolling motion between the tool and blank at a uniform velocity in the manner of a gear rolling on a rack to generate the tooth profiles.

16. In a machine for producing cylindrical gears, a tool support, a tool mounted thereon, a blank support, a blank spindle journaled therein, means for moving the tool at a variable velocity of a harmonic nature across the face of the blank in a plane parallel to the blank axis, means for imparting a continuous rotary movement at a uniform velocity to the blank spindle, means for simultaneously imparting an additional relative movement between the tool and blank at a variable velocity also of a harmonic nature but of a different frequency from the first harmonic motion, said last named motion combining with the before mentioned movements to produce the longitudinal tooth shape, and means for simultaneously producing a continuous relative rolling motion between the tool and blank at a uniform velocity in the manner of a gear rolling on a rack to generate the tooth profiles.

17. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting a continuous rotary movement at a uniform velocity to the blank spindle, and means for simultaneously imparting movement to said carrier at a variable velocity, said last named motion combining with the before mentioned movements to produce the longitudinal tooth shape.

18. In a machine for producing cylindrical gears, a tool support, a tool mounted thereon, a blank support, a blank spindle journaled therein, a carrier upon which one of said supports is mounted, means for moving the tool at a variable velocity of a harmonic nature across the face of the blank in a plane parallel to the blank axis, means for imparting a continuous rotary movement at a uniform velocity to the blank spindle, and means for simultaneously imparting to said carrier a movement at a variable velocity, also of a harmonic nature but of a different frequency from the first harmonic motion, said last named motion combining with the before mentioned movements to produce the longitudinal tooth shape.

19. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting a continuous rotary movement at a uniform velocity to the blank spindle, and means for simultaneously moving said carrier at a variable velocity in a direction tangential to the pitch surface of the blank.

20. In a machine for producing cylindrical gears, a tool support, a tool mounted thereon, a blank support, a blank spindle journaled therein, a carrier upon which one of said supports is mounted, means for moving the tool at a variable velocity of a harmonic nature across the face of the blank in a plane parallel to the blank axis, means for imparting a continuous rotary movement at a uniform velocity to the blank spindle, and means for simultaneously imparting to said carrier a translatory motion in a direction tangential to the pitch surface of the blank at a variable velocity also of a harmonic nature but of a different frequency from the first harmonic motion.

21. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting a continuous rotary movement at a uniform velocity to the blank spindle, means for simultaneously producing an additional relative movement between the tool and blank at a variable velocity, said last named motion combining with the before mentioned movements to produce the longitudinal tooth shape, and means for simultaneously and in timed relation with the blank rotation, imparting to said carrier a movement at a uniform velocity to generate the tooth profiles.

22. In a machine for producing cylindrical gears, a tool support, a tool mounted thereon, a blank support, a blank spindle journaled therein, a carrier upon which one of said supports is mounted, means for moving the tool at a variable velocity of a harmonic nature across the face of the blank in a plane parallel to the blank axis, means for imparting a continuous rotary movement at a uniform velocity to the blank spindle, means for simultaneously producing an additional relative movement between tool and blank at a variable velocity, also of a harmonic nature but of a different frequency from the first harmonic motion, said last named motion combining with the before mentioned movements to produce the longitudinal tooth shape, and means for simultaneously and in timed relation with the blank rotation, imparting a movement at a uniform velocity to said carrier to generate the tooth profiles.

23. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting a continuous rotary movement at a uniform velocity to the blank spindle, means for simultaneously producing an additional relative movement between the tool and blank at a variable velocity, said last named motion combining with the before mentioned movements to produce the longitudinal tooth shape, and means for simultaneously and in timed relation with the blank rotation imparting to said carrier a translatory movement at a uniform velocity in a direction tangential to the pitch surface of the blank to generate the tooth profiles.

24. In a machine for producing cylindrical gears, a tool support, a tool mounted thereon, a blank support, a blank spindle journaled therein, a carrier upon which one of said supports is mounted, means for moving the tool at a variable velocity of a harmonic nature across the face of the blank in a plane parallel to the blank axis, means for imparting a continuous rotary movement at a uniform velocity to the blank spindle, means for simultaneously producing an additional relative movement between the tool and blank at a variable velocity, also of a harmonic nature but of a different frequency from the first harmonic motion, said last named motion combining with the before mentioned movements to produce the longitudinal tooth shape, and means for simultaneously and in timed relation with the blank rotation imparting to said carrier a translatory movement at a uniform velocity in a direction tangential to the pitch surface of the blank to generate the tooth profiles.

25. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting a continuous rotary movement to the blank spindle, means for imparting to said carrier a uniform velocity movement in a direction tangential to the pitch surface of the blank and means for simultaneously imparting to said carrier a variable velocity movement, also in a direction tangential to the pitch surface of the blank.

26. In a machine for producing cylindrical gears, a tool support, a tool mounted thereon, a blank support, a blank spindle journaled therein, a carrier upon which one of said supports is mounted, means for moving the tool at a variable velocity across the face of the blank in a plane parallel to the blank axis, means for imparting to the blank spindle a continuous rotary movement at a uniform velocity, means for imparting to said carrier a uniform velocity movement to generate the tooth profiles and means for simultaneously imparting to said carrier a variable velocity movement, said last named movement combining with the tool motion and the uniform rotation of the blank to produce the longitudinal tooth shape.

27. In a machine for producing cylindrical gears, a tool support, a tool mounted thereon, a blank support, a blank spindle journaled therein, a carrier upon which one of said supports is mounted, means for moving said tool at a variable velocity of a harmonic nature across the face of the blank in a plane parallel to the blank axis, means for imparting to the blank spindle a continuous rotation at a uniform velocity, means for imparting to said carrier a uniform velocity movement in a direction tangential to the pitch surface of the blank, and means for simultaneously imparting to said carrier a variable velocity movement of a harmonic nature but of a frequency different from the first harmonic movement in the direction last described.

28. In a machine for producing cylindrical gears, a tool support, a tool mounted thereon, a blank support, a blank spindle journaled therein, a carrier upon which one of said supports is mounted, means for moving the tool across the face of the blank in a plane parallel to the blank axis at a variable velocity of a harmonic nature, means for imparting to the blank spindle a continuous rotation at a uniform velocity, means for imparting to said carrier a variable velocity movement of a harmonic nature but of a different frequency from the first harmonic movement, said last named movement combining with the before mentioned motions to produce the longitudinal tooth shape and means for simultaneously imparting to said carrier a uniform velocity movement to generate the tooth profiles.

29. In a machine for producing cylindrical gears, a tool support, a tool mounted thereon, a blank support, a blank spindle journaled therein, a carrier upon which one of said supports is mounted, means for moving the tool across the face of the blank in a plane parallel to the blank axis at a variable velocity, means for imparting to the blank spindle a continuous rotary movement at a uniform velocity, means for imparting an additional relative movement between tool and blank at a variable velocity, said last named motion combining with the beforementioned movements to produce the longitudinal tooth shape, means for continuously imparting movement to said carrier at a uniform velocity to generate the tooth profiles, and compensating means for maintaining a timed relation between the blank rotation and tool movement during the movement of said carrier.

30. In a machine for producing cylindrical gears, a tool support, a tool mounted thereon, a blank support, a blank spindle journaled therein, a carrier upon which one of said supports is mounted, means for moving the tool across the face of the blank in a plane parallel to the blank axis at a variable velocity of a harmonic nature, means for imparting to the blank spindle a continuous rotary movement at a uniform velocity, means for producing an additional relative movement between the tool and blank at a variable velocity of a harmonic nature but of a different frequency from the first harmonic movement, said last named movement combining with the beforementioned motions to produce the longitudinal tooth shape, means for continuously imparting to said carrier a movement at a uniform velocity to generate the tooth profiles, and compensating means for maintaining a timed relation between the blank rotation and the tool movement during the movement of said carrier.

31. In a machine for producing cylindrical gears, a tool support, a tool mounted thereon, a blank support, a blank spindle journaled therein, a carrier upon which one of said supports is mounted, means for moving the tool across the face of the blank in a plane parallel to the blank axis at a variable velocity, means for imparting to the blank spindle a continuous rotary movement at a uniform velocity, means for imparting an additional relative movement between tool and blank at a variable velocity, said last named motion combining with the before mentioned movements to produce the longitudinal tooth shape, means for imparting a continuous translatory movement at a uniform velocity to said carrier in a direction tangent to the pitch surface of the blank and compensating means for maintaining a timed relation between the blank rotation and tool movement during the movement of said carrier.

32. In a machine for producing cylindrical gears, a tool support, a tool mounted thereon, a blank support, a blank spindle journaled therein, a carrier upon which one of said supports is mounted, means for reciprocating the tool across the face of the blank in a plane parallel to the blank axis at a variable velocity of a harmonic nature, means for imparting to the blank spindle a continuous rotary movement at a uniform velocity, means for producing an added relative movement between tool and blank at a variable velocity of a harmonic nature but of a different frequency from the first harmonic motion, said last named motion combining with the before mentioned movements to produce the longitudinal tooth shape, means for imparting to said carrier a continuous translatory movement in a plane tangent to the pitch surface of the blank, and compensating means for maintaining a timed relation between the blank rotation and tool reciprocation during the movement of said carrier.

33. In a machine for producing cylindrical gears, a tool support, a tool mounted thereon, a blank support, a blank spindle journaled therein, a carrier upon which one of said supports is mounted, means including a crank and connecting rod for reciprocating the tool at a variable velocity across the face of the blank in a plane parallel to the blank axis, means for imparting a continuous rotary movement to the blank spindle at a uniform velocity, a screw operatively connected with said carrier, means for continuously rotating said screw to impart to said carrier a translatory movement in a plane tangent to the pitch surface of the blank, compensating mechanism for maintaining a timed relation between the tool reciprocation and blank rotation, and means for imparting an additional relative movement at a variable velocity between the tool and blank said last named movement combining with tool motion and blank rotation to produce the longitudinal tooth shape.

34. In a machine for producing cylindrical gears, a tool support, a tool mounted thereon, a blank support, a blank spindle journaled therein, a carrier upon which one of said supports is mounted, means including a crank and connecting rod for reciprocating the tool at a variable velocity across the face of the blank in a plane parallel to the blank axis, means for imparting to said blank spindle a continuous rotary movement at a uniform velocity, a screw operatively connected with said carrier, means for continuously rotating said screw to impart to said carrier a translatory movement in a plane tangent to the pitch surface of the blank, compensating mechanism for maintaining a timed relation between the tool reciprocation and blank rotation, and means for simultaneously imparting a reciprocatory movement at a variable velocity to said carrier, said last named movement combining with the tool motion and blank rotation to produce the longitudinal tooth shape.

35. In a machine for producing cylindrical gears, a tool support, a tool mounted thereon, a blank support, a blank spindle journaled therein, a carrier upon which one of said supports is mounted, means including a crank and connecting rod for reciprocating the tool at a variable velocity across the face of the blank in a plane parallel to the blank axis, means for imparting to said blank spindle a continuous rotary movement at a uniform velocity, a screw operatively connected with said carrier, means for continuously rotating said screw at a uniform velocity to impart to said carrier a translatory movement in a plane tangent to the pitch surface of the blank, compensating mechanism for maintaining a timed relation between the tool reciprocation and blank rotation, and means for simultaneously reciprocating said screw at a variable velocity of a harmonic nature, but of a different frequency from the movement of the crank.

36. The method of producing a gear which consists in giving a tool a straight line reciprocating cutting motion at a variable velocity in a plane parallel to the axis of the blank while rotating the blank continuously on its axis at a uniform velocity and simultaneously imparting an additional relative movement between the tool and blank at a variable velocity which combined with the other motions will produce longitudinal tooth shape.

37. The method of producing a gear which consists in giving a tool a straight line reciprocating cutting motion at a variable velocity of a harmonic nature in a plane parallel to the axis of the blank while rotating the blank continuously on its axis at a uniform velocity and simultaneously imparting an additional relative movement between the tool and blank at a variable velocity also of a harmonic nature, said last named movement combining with the other motions to produce the longitudinal tooth shape.

38. The method of producing a gear which consists in giving a tool a straight line reciprocating cutting motion at a variable velocity in a plane parallel to the axis of a cylindrical gear blank while rotating the blank on its axis at a uniform velocity and simultaneously imparting an additional relative movement between the tool and blank at a variable velocity, said last named movement combining with the before mentioned motions to produce the longitudinal tooth shape, and simultaneously producing a relative rolling motion between the tool and blank to generate the tooth profiles.

39. The method of producing a gear which consists in giving a tool a straight line reciprocating cutting motion at a variable velocity of a harmonic nature in a plane parallel to the axis of a cylindrical gear blank, while rotating the blank on its axis continuously at a uniform velocity and simultaneously imparting an additional relative movement between the tool and blank at a variable velocity of a harmonic nature but of a different frequency from the variable motion of the tool, said last named motion combining with the before mentioned motions to produce the longitudinal tooth shape, and simultaneously producing a relative rolling motion between the tool and blank to generate the tooth profiles.

40. In a machine for producing cylindrical gears, a tool support, a tool mounted thereon, a blank support, a blank spindle journaled therein, means including a crank for reciprocating the tool at a variable velocity across the face of the blank in a plane parallel to the blank axis, means for imparting a continuous rotary movement at a uniform velocity to the blank spindle and means for simultaneously producing an additional relative movement at a variable velocity between the tool and blank, said last named movement combining with the before mentioned motions to produce the longitudinal tooth shape.

41. In a machine for producing cylindrical gears, a tool support, a tool mounted thereon, a blank support, a blank spindle journaled therein, means including a crank for reciprocating the tool at a variable velocity across the face of the blank in a plane parallel to the blank axis, means for imparting a continuous rotary movement at a uniform velocity to the blank spindle, and means for simultaneously producing an additional relative motion at a variable velocity between the tool and blank, said last named motion combining with the before mentioned movements to produce the longitudinal tooth shape, and means for simultaneously producing a relative rolling motion between the tool and blank to generate the tooth profiles.

ALLAN H. CANDEE.
MAGNUS H. JOHANSON.